*INVENTOR.*
MORTON S. BROMFIELD
*BY*
EZEKIEL WOLF, WOLF & GREENFIELD
ATTORNEYS

METHOD OF MANUFACTURING SHOES
Original Filed May 4, 1959 3 Sheets-Sheet 2
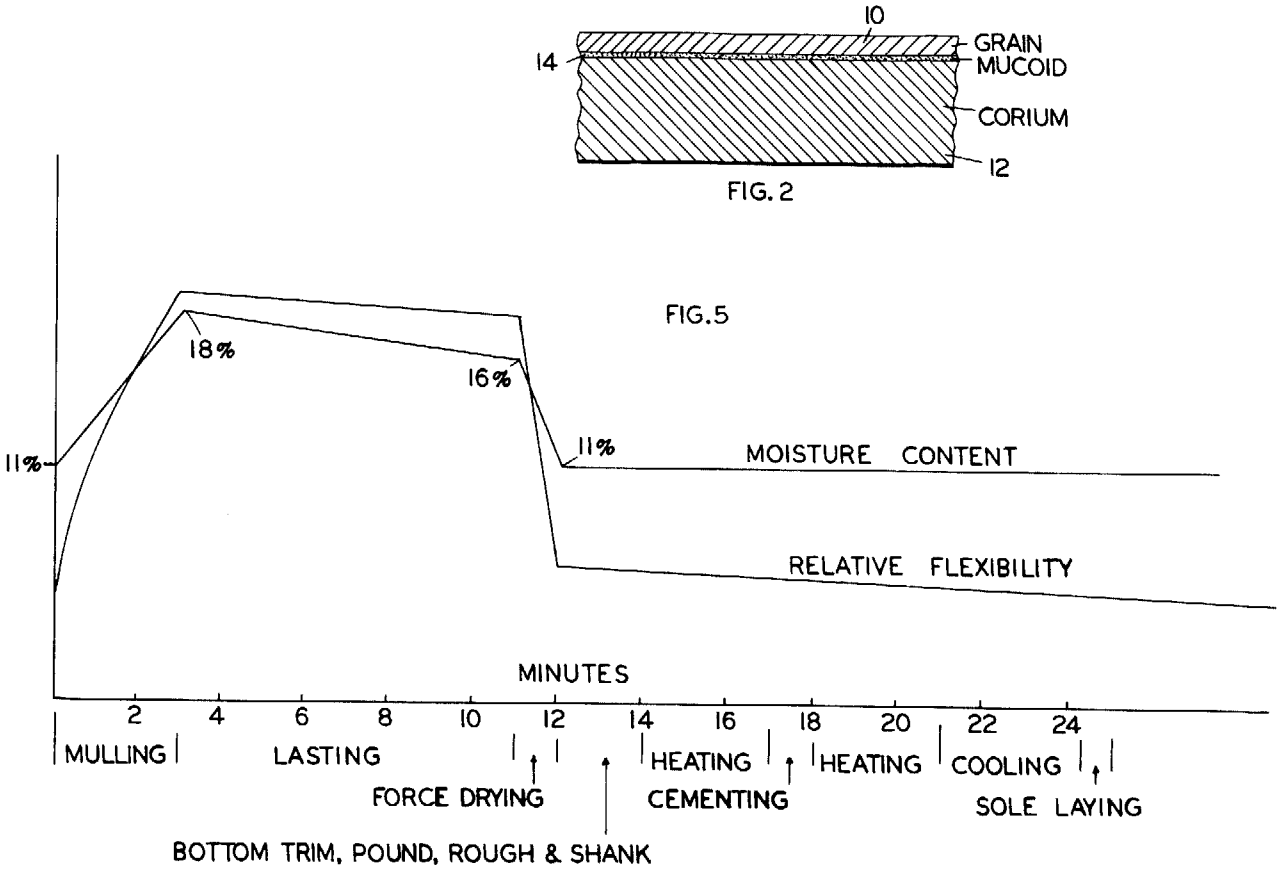
*INVENTOR.*
MORTON S. BROMFIELD
*BY*
EZEKIEL WOLF, WOLF & GREENFIELD
ATTORNEYS

METHOD OF MANUFACTURING SHOES

Original Filed May 4, 1959 3 Sheets-Sheet 3

INVENTOR.
MORTON S. BROMFIELD
BY
EZEKIEL WOLF, WOLF & GREENFIELD
ATTORNEYS

United States Patent Office

Re. 25,411
Reissued July 9, 1963

25,411

METHOD OF MANUFACTURING SHOES

Morton S. Bromfield, 76 Rolling Lane, Weston, Mass.

Original No. 2,973,530, dated Mar. 7, 1961, Ser. No. 810,807, May 4, 1959. Application for reissue Feb. 28, 1963, Ser. No. 262,303
5 Claims. (Cl. 12—142)

Matter enclosed in heavy brackets [ ] appears in the original patent but forms no part of this reissue specification; matter printed in italics indicates the additions made by reissue.

This application relates to the manufacture of shoes and is a continuation-in-part of my copending applications Serial Nos. 667,988 and 736,913 filed June 25, 1957 and May 21, 1958 respectively. In the earlier of my two copending applications I disclose a method of laying cemented soles which employs heat in a novel manner to improve the finished shoe and reduce the cycle time of manufacturing.

The most important object of my invention is to improve the efficiency of shoemaking.

Another object of my invention is to improve the quality of shoes.

The most important feature of my invention resides in a combination of process steps comprising moistening only the surface zones of upper stock, such as leather, lasting the shoe shortly after the moistening step, while the stock is in a condition of maximum flexibility and prior to permeation of the stock by moisture, and then quickly removing the moisture from the surface zones, thereby simultaneously causing maximum shrinkage of the stock upon the last and also achieving optimum stress relief.

Several important advantages flow from the practice of my invention:

(1) Lasting is more easily accomplished, not only because the upper stock is at maximum flexibility but also because uppers may be sequentially mulled continuously and uniformly, thus minimizing variations in the force and stroke required of the lasting instrumentalities.

(2) The elapsed time the upper must remain on the last may be cut to about half an hour, even for shoes of best quality.

(3) Force drying of the lasted shoe begun when the surface zones of the upper stock have relatively high moisture content and prior to permeation of the central zone by the moisture results in maximum shrinkage of the upper upon the last, thus ensuring optimum lasting. Moreover force drying under such conditions brings about maximum stress relief, thereby obviating insofar as possible the troublesome tendency of upper stock, particularly leather, to revert to its original flat condition.

(4) Important cost savings are inherent in the process of the invention, since fewer lasts are required than in processes customarily employed, labor time per shoe is reduced, and the number of "cripples" are markedly reduced.

Before uppers are lasted, it is common practice in most shoe factories to condition uppers in mullers for several hours. Ordinarily, the uppers are taken from the stitching room by case lots and placed in the mullers. The uppers are nested in stacks on racks and, after remaining in the muller for at least several hours, the case lots are removed a few at a time in accordance with the demand in the lasting room. The uppers at the ends of the nested stack necessarily receive more moisture than those which lie intermediate the ends, and, therefore, the moisture content of the several uppers within a single lot is not uniform. Moreover, the moisture content throughout each upper is not uniform because of the nesting characteristics of the uppers. While some parts of each upper are in contact with parts of adjacent uppers and are thus insulated from the heat and moisture of the muller, other parts of the uppers are spaced from the adjacent uppers and exposed to the muller atmosphere. The lack of uniformity is further aggravated by the fact that some case lots remain in the muller for but a few hours, while others remain in the muller for twenty-four hours or more, and when the uppers are lasted, the moisture in some will have dispersed throughout the material while in others a moisture gradient may yet exist. In an effort to compensate for the nonuniform moisture conditions many lasting operators employ steam boxes disposed beside their benches to remull a part or all of each upper handled by them.

The lack of uniform workability and shrinkage resulting from the conventional method of shoemaking described above has prompted those engaged in research in this field to discover alternate mulling and drying techniques. Some have suggested that leather uppers be immersed completely in water before lasting and thoroughly soaked to provide greater flexibility and that they be force dried after the lasting operations are completed to remove the moisture. These practices have proved unsatisfactory because they often cause the leather to become brittle or scorched. The use of superheated steam is suggested for retempering after mulling as a means of introducing a minimal amount of moisture to the surface of the leather uppers to avoid the formation of water droplets on the leather surface in greater quantities than can be absorbed by the leather. The water droplets not only mar certain leather finishes but also exaggerate the stretch characteristics of different portions of the skin. For example, the soft fleshy areas of the skin, which normally are more stretchable than the bony areas, absorb moisture more rapidly. Thus, the stretch differential of these portions is exaggerated. Superheated steam mullers have not be adopted by the industry because of the necessity for close time control to minimize the shrinkage and shrivelling effects.

Others engaged in research to develop alternate mulling techniques have recognized the accelerated tempering effect upon leather of high temperature moisturized atmosphere. However, because they assume the loss of surface moisture concentration to be a loss in the total included moisture from the leather to the atmosphere, they have limited and reduced the temperature in the muller in an effort to retard this apparent loss and at the same time have reduced mulling speeds. Inasmuch as no moisture meters available today can accurately measure moisture unequally dispersed in leather, there is no support for the assumed moisture loss. In fact, tests performed with leather, surface moistened and immediately thereafter placed in an enclosed atmosphere, demonstrated the rapidity of moisture dispersion throughout leather. Therefore, I conclude that there is no appreciable loss in total moisture but rather the surface loss is caused by diffusion of the moisture throughout the leather cross section, and the use of lower mulling temperatures does not significantly retard the loss of surface moisture but does compromise desirable shortened mulling times.

Another feature of my invention resides in the utilization of the drying heat to help develop a heat reservoir in the overlasted margin of the upper before sole attaching cement is applied to the margin. The established heat reservoir co-operates with additional heat applied to the exposed surface of the cement to condition the cement for receiving the sole.

These and other objects and features of my invention will be best understood and appreciated from the following detailed description of a preferred method of practicing it, selected for purposes of illustration and shown in the accompanying drawing, in which:

FIGURE 2 is a cross sectional view of a piece of leather;

FIGURE 5 is a graph showing the moisture content and relative flexibility of the upper throughout the manufacturing cycle practiced on the line of FIGURE 4.

For the fullest appreciation of my invention, certain characteristics of leather should be considered. First, contrary to common belief, the stiffness of leather is not inversely proportional to its moisture content. Immediately upon the application of moisture to the surface fibers of leather, it does become more workable and the workability of the leather increases for a short period following the application. However, the stiffness of the leather thereafter increases as the moisture leaves the extreme fibers and lowers its concentration by dispersing throughout the leather thickness.

Figure 1:
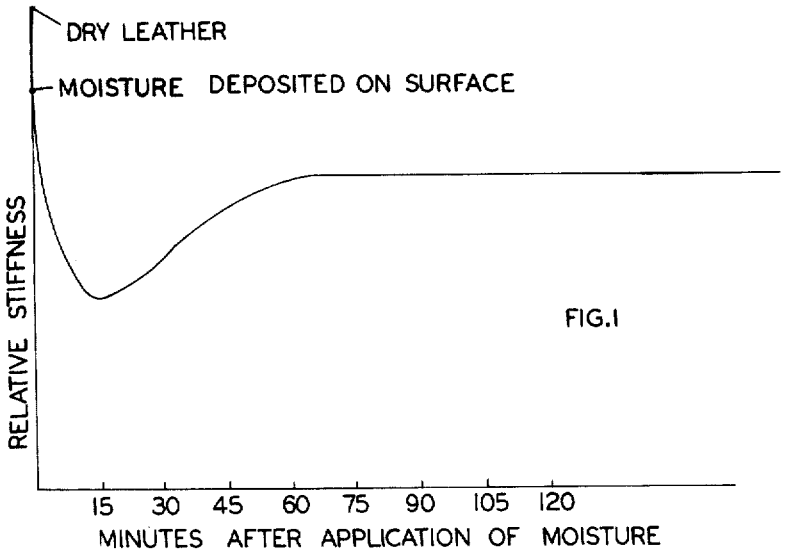
FIGURE 1 is a graph illustrating the effects of moisture dispersion on the stiffness of leather.

The graph of FIGURE 1 illustrates the effect of moisture upon leather described above, when the total moisture content of the leather remains constant. The time values of the abscissa are estimated to be those for the average leather splits used for uppers. These values vary by a scale factor determined by the particular type of leather being treated. For example, with sole leather, the scale factor may have a value of two, and thus, the minimum stiffness of sole leather may occur approximately thirty minutes after moisture is applied to its surface. It will be appreciated that if the total moisture content of the leather uppers remains approximately constant, maximum workability of the leather is available to lasting operators only if their operations are performed before the moisture introduced by mulling disperses throughout the leather. The graph of FIGURE 1 suggests that the lasting operations should be performed within approximately twenty-five minutes after the initial application of moisture to the surface of the leather.

The desirability of confining the moisture to the surface of the leather finds additional support by analogy to the bending beam theory. Although bending beam theory cannot be strictly applied to leather bending, it does give some insight into the physical properties of leather. To apply this theory, an understanding of leather structure is necessary. In FIGURE 2, I have shown a cross section of a typical leather skin. The grain area 10 of the leather is known to have approximately one-half the tensile strength of the corium 12 and also has poorer elongation properties than the corium. Thus, when a leather upper is overworked or overstretched, the grain layer ruptures first. The mucoid layer 14 is primarily a bonding film between the grain and the corium and is a negligible factor when considering the structural properties of leather. While the corium has greater tensile strength than the grain, the usual splitting of a hide into at least two separate skins results in splaying open the corium fiber bundles, much like cutting the end of a rope crudely, and markedly weakens the structure. Thus, the grain side of a split skin used unlined or unfinished as a shoe upper has its workability limited by the grain layer both because of its inherent physical properties and because it is the outer fiber area in bending beam theory. As the grain limits the workability of leather, the application of moisture to that area enhances the bendability and stretchability of the material.

The presence of a finish film and a lining on the skin does not alter the requirement for moisture in the surface areas. The tensile strength and elongation properties of leather finishes vary widely but most are thermoplastic. Thus, warm moisture applied to the leather finish gives it all of the flexibility and stretchability required. Upper linings if made of fabric or a thin grain split, limit workability both because of their tensile and elongation properties as well as their possible outer fiber positions in bending beam theory. However, when the lining is mulled it also has the workability and stretchability required. While water is most often used to moisturize and lubricate leather, other chemicals may certainly be used in place of water and their physical properties may make them more desirable.

The effects of heat upon mulling of leather should be considered. Heat lowers the viscosity and surface tension of liquid and enables it to more readily penetrate the surface. Not only does the heat quicken the rate at which the moisture is absorbed into the surface areas of the leather but it also acts upon the thermoplastic fat liquors in leather to soften them. Thus, heat is an important adjunct of moisture in improving the workability and stretchability of leather.

Figure 3:
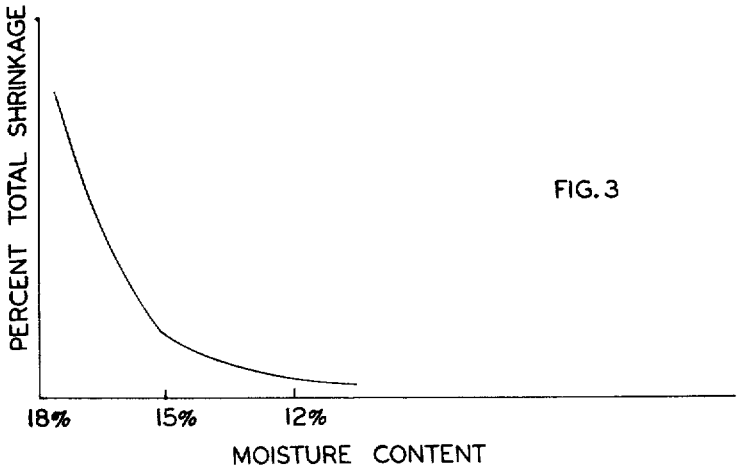
FIGURE 3 is a graph illustrating the effects of rapid drying on total shrinkage of leather with workable amounts of moisture present.

Dispersion may occur both into the atmosphere and into the leather. Dispersion into either avenue adversely affects workability but dispersion into the leather alone markedly limits the drying rate and the shrinkage possible. Greater shrinkage of leather occurs in response to rapid drying when the moisture content and concentration in the leather initially is relatively high. The combination of heat and adequate moisture allows for maximum fiber movement. These facts suggest that force drying should be performed as soon after mulling as possible, that is, before any appreciable dispersion of moisture occurs. When heat is applied to force dry the leather while the moisture is still confined to the surface areas, the heat is able to reach the moisture readily and lower its viscosity to make its removal easier and without matting the fibrils and increasing the leather stiffness. If the moisture is allowed to permeate the skin, all of the moisture cannot be withdrawn quickly from the material. As the moisture is initially rapidly withdrawn from the interior zones of the leather, it carries the salts and other tanning solids with it. These materials build up on the surface of the skin and cause case hardening which locks in moisture yet to be withdrawn. Because maximum shrinkage is predicated upon rapid drying, it will be appreciated that unless drying heat is applied to the leather before the moisture permeates the skin, the optimum shrinking characteristics of leather illustrated in FIGURE 3 cannot be utilized. Moreover, drying heat, applied to the leather before appreciable moisture dispersion, is consumed in the evaporation of the moisture in the surface zones and does not scorch the leather. In effect, the shoemaker competes against the time required for a given amount of moisture to diffuse within the material to the detriment of both workability and very rapid, safe removal of moisture.

The combination of moisture and heat also performs a stress relieving action in leather. With sufficient moisture present in the leather to lubricate the least ductile grain fibers, heat is able to reach the moisture and soften the fat liquors and the relatively stiff grain fibers within and beyond the moisture laden area to allow maximum movement of the fibers. The heat causes the fat liquors and fibers to yield to the accelerated shrinkage induced by rapid moisture removal. As a result, the stress relieving effects a shrinkage in the slack areas of the upper and a relief of tension in the taut areas for an intimate last fit. If the stresses of the leather are not relieved in this manner before the last is pulled, they will cause flattening of the lines of the upper after the last is pulled. Furthermore, when a completed shoe which has not been stress relieved is worn, the heat and moisture transferred from the foot to the material, coupled with the stretching forces applied by the foot, will cause further shrinkage to occur after the shoe is removed. As a result, stress relieving may occur after wearing and in the absence of a last in the shoe, can cause the shoe to deform. However, if maximum shrinkage occurs through the co-operation of heat and properly positioned moisture in adequate amounts, stress relieving occurs on the last. Also, a more durable fit results, because rapid force drying beneath the level of moisture which leather might normally acquire from the factory atmosphere produces a locking of the fibers that subsequently absorbed moisture does not release. This locking occurs from the combination of heat and moisture removal that diminishes the memory of elastic materials. The memory of the lasted leather is further diminished by fracturing of filaments in the interior, unmoisturized zones of the leather cross section.

Figure 4:
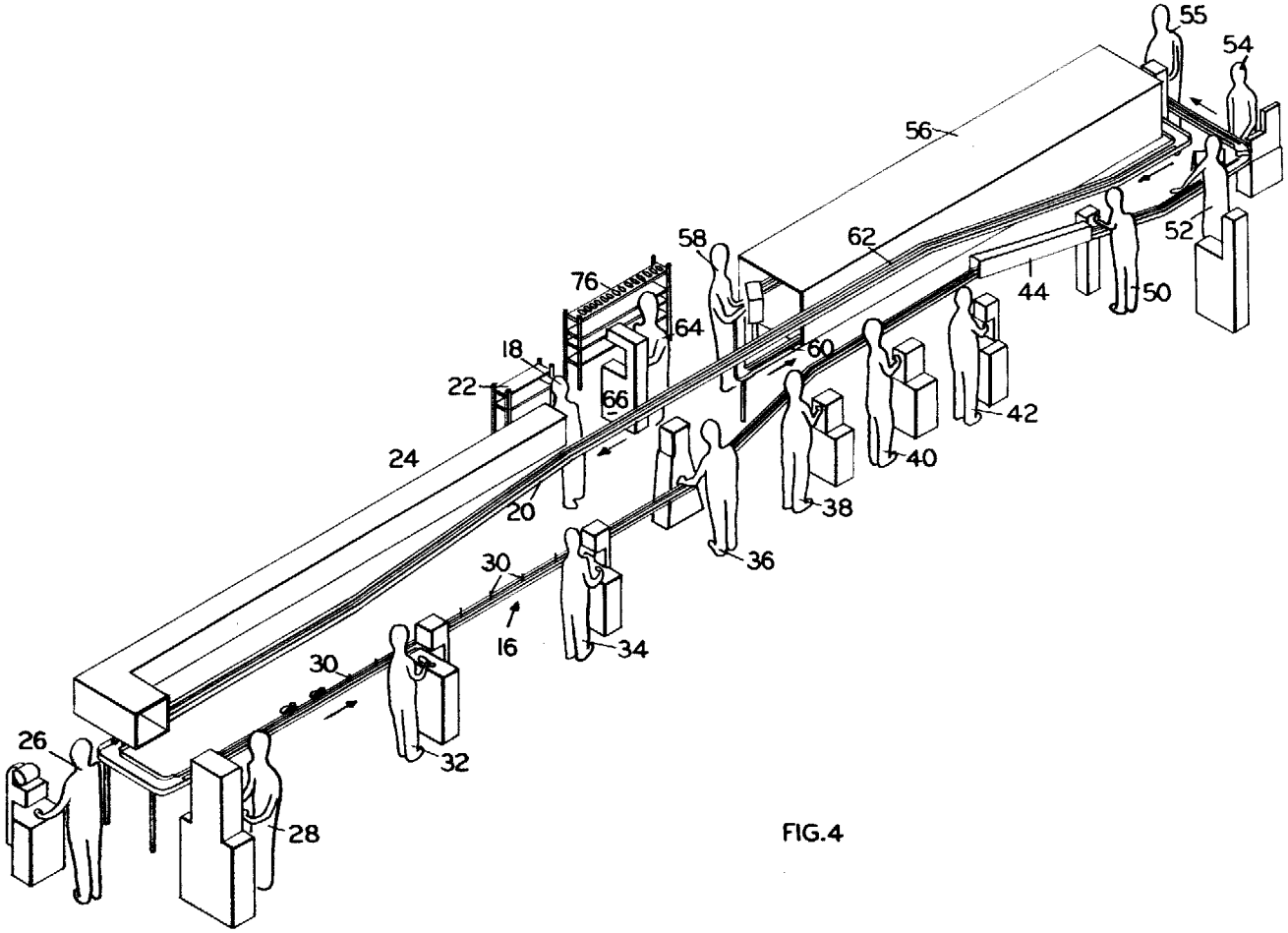
FIGURE 4 is a diagrammatic view in perspective of an assembly line which may be used to practice the method of my invention.

The shoemaking method of my invention which takes advantage of the several characteristics of leather described above may be practiced on the assembly line shown in FIGURE 4 . It should be understood that other systems may be used and that the following description of FIGURE 4 serves merely as one example of a manner of practicing my invention.

The assembly line shown in FIGURE 4 is provided to carry the various shoe parts to the several operators disposed about it and also serves to carry the shoe parts through a muller and several heaters whose functions are described in detail below.

The conveyor 16 travels an endless course about the several operators stationed adjacent to it. An operator 18 positioned intermediate the ends of the run 20 of the conveyor 18 takes stitched uppers one at a time from a rack 22 and places them in a muller 24 disposed above the conveyor. A conveyor (not shown) travels through the muller 24 and transports the uppers to an operator 26 stationed at the discharge end of the muller.

The warm moist atmosphere of the muller may be maintained by bubbling steam through a water filled trough. The actual manner in which the desired atmospheric conditions are created is not part of this invention and is not shown. The outer surfaces of the upper are exposed to this moist atmosphere and absorb water. Uppers when placed in the muller have a moisture content of approximately eleven percent by weight and upon leaving the muller the moisture content of the surface zones leather is approximately 18 to 22%. In FIGURE 5 moisture content and flexibility are plotted against time and this increase in the moisture content is illustrated. Approximately three minutes are required for the uppers to travel through the muller, and maximum moisture content is shown to occur in FIGURE 5 three minutes after the beginning of the manufacturing cycle. It will also be noted in FIGURE 5 that when the upper leaves the muller it has approximately maximum relative flexibility.

The temperature of the muller atmosphere is maintained at approximately 140° F.–180° F., a range close to steam temperature and well above normal mulling temperatures which are usually below the melting temperature of leather fibrils, 130° F. The relatively high temperature of the muller gives it a capacity many times greater than conventional mullers, and the muller is able to provide accelerated moisture absorption comparable to that provided by steam but without the uncontrolled shrinkage that can result. The additonal heat of vaporization that would pass from the steam into the leather with condensation would unnecessarily raise the leather temperature and reduce the leather-atmosphere temperature differential so important in mulling rate.

As the operator 18 places the uppers on the conveyor in the muller 24, he also places an outsole and a matching counter on the conveyor 16. As the upper reaches the end of the muller and is drop-delivered to the operator 26, the matching outsole and counter arrive on the conveyor 16 at his station. After inserting the counter, the operator 26 assemblies the upper on the last and then hands the assembled upper on the last to the pull-over operator 28. The pull-over operator 28 ideally pulls the shoes in pairs on conventional machinery and then places the lasts on the transport posts 30 carried by the conveyor 16.

The conveyor 16 carries the shoes to the side lasters 32 and 34, who side last the left and right shoes respectively, and thereafter replace them on the transport posts 30. The conveyor transports the shoes to the forepart laster 36 who wipes in and secures the forepart of each upper and places the shoes on a secondary conveyor (not shown) which carries them over a perforated plate which emits steam. On the secondary conveyor the shoes are disposed in an upright position and the steam is directed to the underside of the leather through the downwardly extending "rabbit ears" which are formed between the pull-over tacks. This application of steam softens the box toe of the upper which is normally thermoplastic.

As stated heat is an important adjunct of moisture in maintaining leather in a workable condition. By the time the shoes reach the forepart laster 36, they have lost a considerable amount of heat and are approximately at ambient temperature. While only heat is required to restore the maximum workability to the leather, heat applied alone to the leather would cause the moisture in the surfaces zones to evaporate. To avoid this result, the leather temperature is increased by the use of steam.

The secondary conveyor carries the shoes to the bed-lasters 38 and 40 who last the toes cf the shoes and replace them on the transport posts carried by the conveyor 16. The conveyor 16 next brings the shoes to the heel seat laster 42 who removes the insole tacks and nails the heel seat in place on each shoe.

When the heel seat laster completes his operations on each shoe conveyed to him, the lasting operation is substantially completed. Approximately eight minutes are required to perform all of these lasting operations, and, therefore, in about eleven minutes after the operator 18 places the uppers in the muller, the moisture may be removed from the leather. It will be noted in FIGURE 5 that the moisture content of the leather remains substantially constant during the eight minute lasting period and the moisture initially introduced by mulling has not had an opportunity to disperse throughout the material. In FIGURE 5, I have also shown that no appreciable change in flexibility of the leather occurs during the eight minute lasting period. Although the graph of FIGURE 1 may suggest that flexibility would increase during that period, in FIGURE 5 I have allowed for a drop in temperature which adversely affects workability and flexibility. Nevertheless, the flexibility curve of FIGURE 5 indicates that maximum workability of the leather is available to the lasting operators when they sequentially perform their several operations immediately after the uppers have been mulled in the muller 24.

Having completed the lasting operations, the moisture should be removed before it has an opportunity to permeate the upper so that maximum shrinkage and the stress relieving action may be secured without causing case hardening. A heater 44 in the form of a shroud surrounding the conveyor is provided for this purpose. The heater 44 may be provided with any form of heat source such as infrared lamps or quartz heaters directing heat to the exposed surface of the leather. During the approximately one minute period required for the uppers to travel through the heater 44, the moisture content of the surface or grain of the leather drops from approximately 16 to 20%, to 11%.

In the description of the characteristics of leather, I demonstrated with the aid of the graph of FIGURE 1 that with a given amount of moisture, greater workability is obtained when that moisture is confined to the surface zones. Moreover, when the moisture is confined to the surface zones, the high moisture concentration causes drying to begin at a higher point on the curve of FIGURE 3 than would be the case if that same moisture dispersed throughout the leather. Thus, greater shrinkage results.

If the moisture concentration is high throughout the cross section of the leather so that all of the zones contain moisture of approximately 18% or more, the leather will of course be flexible, but this condition makes it impossible to remove moisture quickly. Heat will first evaporate the surface moisture and then heat the leather which will increase the capillary action to draw the moisture from within. When this moisture reaches the surface zone, evaporation will again take place. Thus, the applied heat will produce an inverse gradient in the leather, that is, with more moisture in the interior zone than in the grain. In effect, leather wet throughout dries through a series of pulses of moisture transfer, surface evaporation, and shrinkage reversal or swelling. As a result, the shoemaker cannot derive the maximum shrinkage which is obtained by rapid removal of high moisture concentration at the grain area. In effect, the high concentration of moisture throughout the cross section fights shrinkage. Furthermore, if the drying heat evaporates the moisture at the surface zone faster than the interior can release moisture to replace that which has evaporated, overheating, embrittlement, case hardening, and scorching may result.

From the foregoing, the reader will recognize that by practicing my method those characteristics of leather described above are utilized to advantage. The muller applies moisture to the surface zones of the upper where it is required for maximum workability. The lasting operations are performed immediately after mulling when the relative stiffness of the leather is at a minimum. The moisture is removed from the leather by the heater before it has an opportunity to pervade the center zone of the upper, that is, while the moisture gradient is substantially at a maximum, and thus maximum shrinkage and stress relieving action are acquired.

The three minute mulling period, the eight minute lasting period, and the one minute force drying period are particularly suitable for uppers made of leather splits of a weight commonly used in women's shoes. Just as in the relative stiffness graph of FIGURE 1, with heavier stock the time required to last as well as the times required to deposit adequate moisture in the surface areas and thereafter withdraw it will vary by some determinable scale factor.

Continuing with the description of the manufacturing method practiced on the line shown in FIGURE 4, the reader will note that the shoes leaving the heater 44 are delivered to an operator 50 who trims off the lasting allowance from each upper and removes any upstanding tacks. The operator 50 then passes the shoe to the spot inspector 52 who checks each shoe and is in a position to observe the result of any improper operations performed by the several lasting operators up the line. If consistent faults are observed, he is in a position to caution the appropriate operator. The operator 52 may also perform necessary odd crowning operations. After completing his work, the operator 52 replaces the shoe on the transport post of the conveyor and the shoe is carried to operator 54 who pounds the overlasted margin of the upper and roughs it in preparation for the application of a coating of cement. If high heel shoes are in process, an operator 55 is employed to place the shank on each shoe. If flatties are being manufactured, the operator 55 is unnecessary.

After the shoes pass the station of operator 55, they are conveyed in approximately three minutes through the heater 56 to the operator 58 who coats the overlasted margin of the upper with cement and applies filler material to the cavity formed on the insole by the overlasted margin.

In practicing the invention disclosed in my earlier copending application Serial No. 667,988, a heat reservoir is established in the overlasted margin of the upper before a coating of cement is applied to it. As is explained in detail in that application, the heat reservoir co-operates with additional heat applied to the exposed surface of the cement coating to condition the cement for sole laying. This heat reservoir is established in the shoemaking method practiced on the line of FIGURE 1 by the heater 56.

Continuing with the description of the method practiced on the line of FIGURE 4, after the operator 58 coats the overlasted margin of the upper with cement and applies the filler, the shoe is replaced on the conveyor and again carried through the heater 56 on the run 60. This additional heat applied to the exposed coating of the cement co-operates with the heat reservoir developed in the overlasted margin to condition the cement for sole laying. After leaving the heater 56, the shoe travels on the run 62 of the conveyor and the cement coating is allowed to cool at room temperature. Approximately three minutes are required for the shoes to reach operator 64 after leaving the heater 56 for the second time. During this period, the cement reaches or passes through the tacky state. The outsole originally deposited on the conveyor by the operator 18 reaches the operator 64 with the lasted upper and the two parts are coaligned and placed in the press 66. A heater or some other similar device may be mounted adjacent the run 62 of the conveyor 16 automatically to activate the cement on the sole. After the sole layer 64 completes his operations, he places the shoes on the rack 76 which may have previously been emptied by the operator 18 stationed next to him at the head of the line.

I stated above that approximately eleven minutes after the uppers are placed in the muller by the operator 18, the shoes enter the heater 44. The other operations performed about the line are completed in an additional fourteen minute period. The uppers remain in the heater 44 for approximately one minute, pass the station of operator 55 approximately two minutes after leaving the heater 44, and in an additional three minutes reach the cementer 48. Thus, approximately seventeen minutes after the uppers are placed in the muller, the shoes reach the cementer 58. One minute is consumed between the time the shoes leave and reenter the heater 56, and thereafter the shoes spend approximately three minutes in transit through the heater 54 on the run 60 and an additional three and one-half minutes on the run 62 before reaching the operator 64. The shoes are placed in the rack 76 by the sole layer approximately thirty seconds after they reach his station on the conveyor, to complete the twenty-five minute cycle.

From the foregoing, it will be appreciated that the method described has two principal advantages. First, it provides the manufacturer with a vehicle for reducing manufacturing costs, and second, it improves the quality of his product. The number of shoes damaged in process is markedly reduced by the uniform and controlled mulling and the close control over the several shoemaking steps. The flash drying permits the lasts to be pulled from the shoe immediately after sole laying and thus reduces "on-the-wood" time which is directly reflected in the reduced number of lasts required for a given output. Heretofore it has been the normal practice in the manufacture of shoes to leave uppers on the last for several hours or more after the shoemaking operations are completed. In the manufacture of better grades of shoes, the shoes are left on the lasts for several days after assembling is completed. All shoe manufacturers have recognized that only by sacrificing shoe quality can the lasts be pulled from the shoes in less than several days. When uppers are flash mulled and force dried in accordance with this invention, the lasts may be pulled almost immediately after the force drying period, and the quality of the shoes is the equivalent of those left on the lasts a week or more after being manufactured in accordance with standard practices. By the use of flash mulling and drying the work in process may be reduced to approximately 168 shoes, about 3% of the number of shoes in process customarily necessary to achieve a rate of production comparable to that realized from the practice of my invention. The controlled shrinkage of the upper allows the lasting operators to utilize the full lasting allowance before premature shrinkage takes place. The controlled shrinkage also allows for the tighter cutting of patterns which may result in approximately a 3% saving of leather. The intimacy and durability of the fit which are the result of maximum leather shrinkage and stress relieving action provide the manufacturer with an improved product. Furthermore, the original last shape is maintained and the finish of the leather is preserved.

The uniform and controlled mulling also enable the lasting machine tensions to be properly set for a given amount of fight in leather uppers to minimize over or under pulling of variably conditioned uppers. Moreover, the uniformity and control of the mulling enable shoe manufacturers to employ certain automatic lasting equipment which is available but which has not been used in the past, due to the relatively wide variations in the tolerances hitherto encountered in the workability of uppers in the lasting process.

Heretofore the following maxims have been unobtainable. My invention permits these to be a practical and economic reality in shoe making. Moldability and stretch of leather increases with moisture content. Rapid force drying from high moisture level causes maximum shrinkage. This same force drying reduces surface tension and softens any thermoplastic materials present, thus softening and stress relieving under shrinkage change. Cooling to room temperature would reverse this effect and lock materials in lasted shape.

The foregoing description of my invention has been confined to the manufacture of shoes having leather uppers. Nevertheless, my invention is not confined to shoes made of that material. Regardless of the material used for the upper, by analogy to bending beam theory it will be appreciated that its outer fibers are subjected to the greatest stress when the material is lasted. Where woven material are used in place of leather, normally a backing material or interlining is employed. Therefore, the outer fiber material of woven fabric and the inner region material of lining respond in the same fashion to moisture and heat. Thus, if the lasting operations are performed immediately after mulling and then force dried before appreciable dispersion of moisture occurs, the moisture may be removed more quickly with the resulting greater shrinkage and more intimate last fit. Plastic uppers with or without leather or cloth backing also benefit by the practice of my invention. Although the workability of the plastic material is primarily controlled by heat, the elevated mulling temperature used in my method will introduce the flexibility desired for lasting in the short time during which the upper passes through the muller. Therefore, I do not intend to limit the breadth of my invention to the practice of my method on leather shoes alone. Rather, the scope of my invention should be determined by the appended claims and their equivalents.

What I claim as new and desire to secure by Letters Patent of the United States is:

1. In a method of shoemaking, including the steps in sequence of subjecting an outer surface of a leather upper to a water treatment to introduce into an outer surface zone only sufficient water to increase the flexibility of said surface zone, lasting said upper before said water can pervade the center zone of the upper, and subjecting the lasted shoe to heat to remove said water from said surface zone before it pervades the center zone of said upper.

2. The method as set forth in claim 1, further including the step of heating the upper while adding the water to the outer surface zone.

3. In a method of shoemaking, including the steps in sequence of subjecting the surfaces of a leather upper to a water treatment to introduce into the surface zones only sufficient water to increase the flexibility of said surface zones, lasting said upper before said water can pervade the center zone of the upper, and subjecting the lasted shoe to heat to remove said water from the outer surface zone before it pervades the center zone of said upper.

4. The method as set forth in claim 3, further including the step of heating the upper while adding the water to the surface zones.

5. *The method of shoemaking including the steps of mulling and lasting a leather upper, the mulling being controlled to add to the surface zone of the leather upper only sufficient moisture to increase the flexibility of said surface zone, and subjecting the lasted upper to heat treatment to withdraw the mulling moisture before it pervades the center zone of said upper.*

References Cited in the file of this patent or the original patent

UNITED STATES PATENTS

| | | |
|---|---|---|
| 1,825,191 | Lumbard | Sept. 29, 1931 |
| 1,919,464 | Daniels | July 25, 1933 |
| 2,294,481 | Ryan | Sept. 1, 1942 |
| 2,633,583 | Maeser et al. | Apr. 7, 1953 |

OTHER REFERENCES

American Shoemaking, pages 11–14, May 18, 1932.
American Shoemaking, pages 11–16, June 13, 1934.